United States Patent
Sekiya

(10) Patent No.: US 9,819,826 B2
(45) Date of Patent: Nov. 14, 2017

(54) IMAGE FORMING APPARATUS THAT CONTROLS IMAGE FORMING CONDITIONS FOR ADJUSTING IMAGE DENSITY

(71) Applicant: CANON KABUSHIKI KAISHA, Tokyo (JP)

(72) Inventor: Takeshi Sekiya, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/235,780

(22) Filed: Aug. 12, 2016

(65) Prior Publication Data
US 2017/0070636 A1    Mar. 9, 2017

(30) Foreign Application Priority Data
Sep. 7, 2015   (JP) .................. 2015-175888

(51) Int. Cl.
*H04N 1/23* (2006.01)
*G03G 15/00* (2006.01)
*H04N 1/028* (2006.01)
*H04N 1/00* (2006.01)

(52) U.S. Cl.
CPC ....... *H04N 1/2346* (2013.01); *G03G 15/5041* (2013.01); *G03G 15/5045* (2013.01); *H04N 1/00814* (2013.01); *H04N 1/02815* (2013.01)

(58) Field of Classification Search
CPC ............. H04N 1/2346; H04N 1/00814; H04N 1/02815; G03G 15/5041; G03G 15/5045
See application file for complete search history.

(56) References Cited

U.S. PATENT DOCUMENTS

| | | | |
|---|---|---|---|
| 6,597,878 B2* | 7/2003 | Nakazato | G03G 15/5062 399/49 |
| 7,489,883 B2* | 2/2009 | Rossi | H04N 5/361 348/243 |
| 8,564,771 B2* | 10/2013 | Sekine | G01J 3/20 356/326 |

FOREIGN PATENT DOCUMENTS

JP    2011-112988 A    6/2011

* cited by examiner

*Primary Examiner* — Gregory H Curran
(74) *Attorney, Agent, or Firm* — Fitzpatrick, Cella, Harper & Scinto

(57) ABSTRACT

An image forming apparatus includes: an output unit configured to receive light reflected from a measurement image on an image carrier and output a signal corresponding to a light receiving result; a detection unit configured to detect a temperature of the output unit; a conversion unit configured to convert an output value output from the output unit, based on a conversion condition; a controller configured to control an image forming condition for adjusting a density of an image to be formed based on a converted output value by the conversion unit; and a generation unit configured to, at a predetermined timing, acquire an output value output from the output unit without emitting light, control the detection unit to detect the temperature, and generate the conversion condition based on the acquired output value and the detected temperature.

8 Claims, 6 Drawing Sheets

FIG. 4
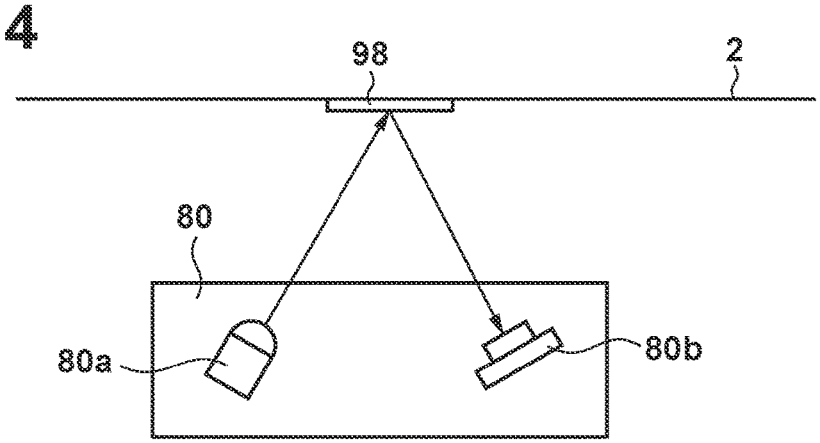
FIG. 5
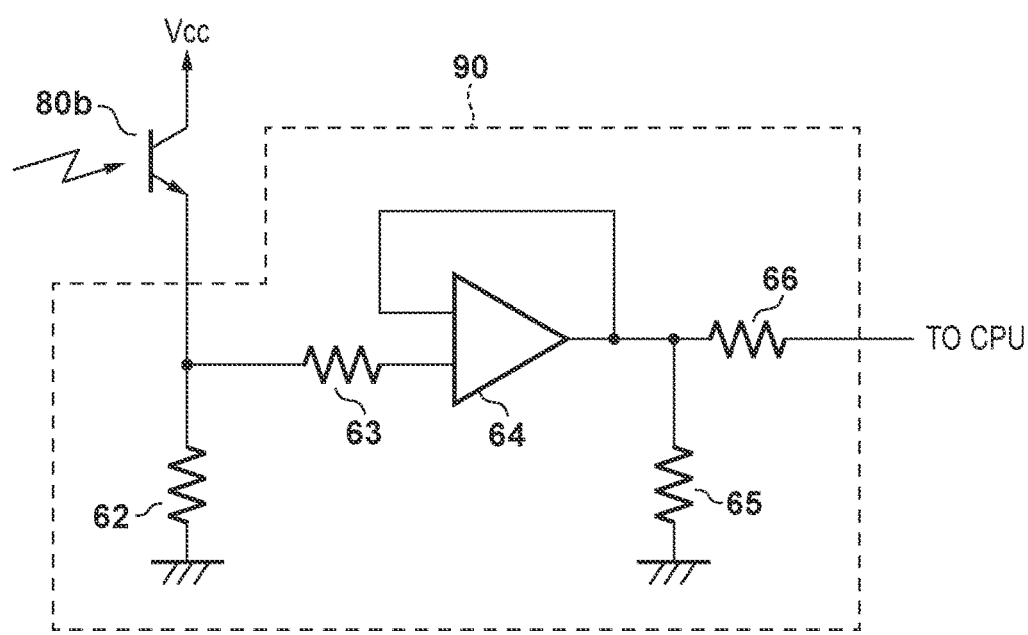
FIG. 6
| TEMPERATURE (°C) | 15 | 20 | 25 | 30 | 35 | 40 |
|---|---|---|---|---|---|---|
| OFFSET VOLTAGE (mV) | 251 | 260 | 271 | 289 | 304 | 310 |

IMAGE FORMING APPARATUS THAT CONTROLS IMAGE FORMING CONDITIONS FOR ADJUSTING IMAGE DENSITY

BACKGROUND OF THE INVENTION

Field of the Invention

The present invention relates to a density correction technique in an image forming apparatus.

Description of the Related Art

In electrophotographic image forming apparatuses, misregistration correction and density correction are performed in order to maintain the quality of images to be formed. For example, density correction is performed by forming a density correction test pattern on an image carrier such as a photosensitive member or an intermediate transfer member, and detecting the density of the test pattern with an optical sensor to generate a tone correction table. Here, even if light is not incident on a light receiving element of the optical sensor, a minute current, that is, dark current, flows therethrough. This dark current fluctuates according to temperature, and therefore the voltage output by the optical sensor also changes due to changes in the temperature of the optical sensor. For this reason, Japanese Patent Laid-Open No. 2011-112988 discloses a configuration for measuring an offset voltage that occurs due to the dark current of the light receiving element prior to the detection of the test pattern, and detecting the density of a test pattern with consideration to the measured offset voltage.

In order to reduce the time taken for density correction by the image forming apparatus, there is a need to reduce the frequency of measuring the offset voltage that occurs due to the dark current of the light receiving element. For this reason, a configuration can be employed in which measurement of the offset voltage is carried out only when the image forming apparatus is powered on. Then, in the density correction, the density of the test pattern is obtained with reference to the offset voltage acquired at the time of power on. However, if the temperatures of the optical sensor at the time of power on and at the time of density correction are different, the value of the offset voltage that occurs due to the dark current also changes, and thus the error in the detected density of the test pattern increases. On the other hand, if the offset voltage that occurs due to the dark current is measured at each instance of density correction, the time taken for density correction increases and the downtime of the apparatus increases.

SUMMARY OF THE INVENTION

According to an aspect of the present invention, an image forming apparatus includes: an image carrier; an image forming unit configured to form an image on the image carrier; a light emitting unit configured to emit light; an output unit configured to receive light reflected from a measurement image on the image carrier and output a signal corresponding to a light receiving result; a detection unit configured to detect a temperature of the output unit; a conversion unit configured to convert an output value output from the output unit, based on a conversion condition; a controller configured to control an image forming condition for adjusting a density of an image to be formed by the image forming unit, based on a converted output value by the conversion unit; and a generation unit configured to, at a predetermined timing, acquire an output value output from the output unit without the light emitting unit emitting light, control the detection unit to detect the temperature of the output unit, and generate the conversion condition based on the acquired output value and the detected temperature.

Further features of the present invention will become apparent from the following description of exemplary embodiments with reference to the attached drawings.

BRIEF DESCRIPTION OF THE DRAWINGS

FIG. 4 is a configuration diagram of a sensor according to an embodiment.

FIG. 5 is a configuration diagram of a light receiving circuit of a sensor according to an embodiment.

FIG. 6 is a diagram showing a relation between a temperature of the sensor and an offset voltage according to an embodiment.

DESCRIPTION OF THE EMBODIMENTS

Exemplary embodiments of the present invention will be described below with reference to the drawings. Note that the following embodiments are examples and the present invention is not limited to the content of the embodiments. Also, in the following diagrams, constituent elements unnecessary to the description of the embodiments have been omitted from the diagrams.

First Embodiment

Figure 1:
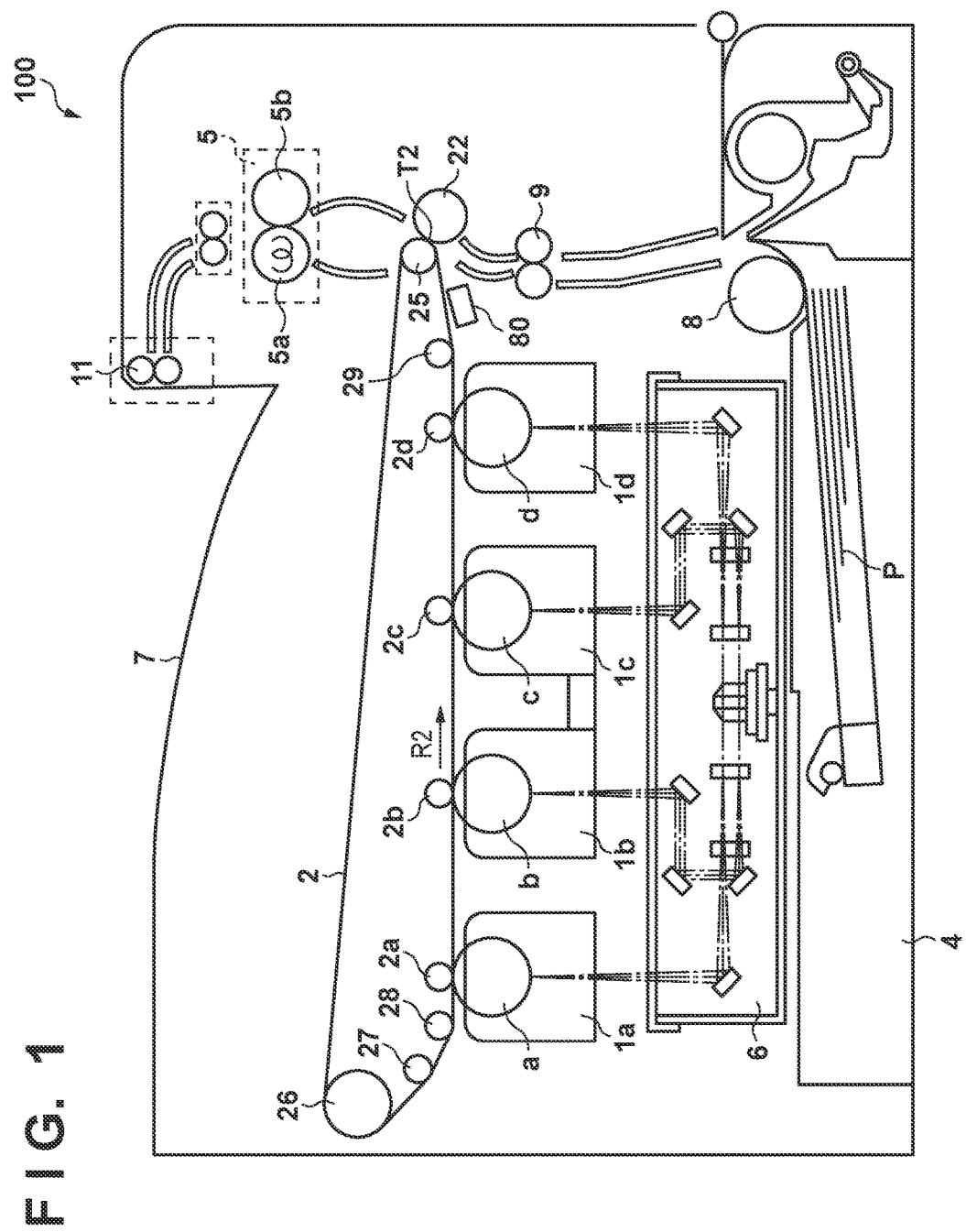
FIG. 1 is a configuration diagram of an image forming apparatus according to an embodiment.

FIG. 1 shows a configuration diagram of an image forming apparatus 100 according to the present embodiment. The image forming apparatus 100 includes image forming units 1a, 1b, 1c, and 1d arranged in a line along an intermediate transfer belt 2. Apart from the toner colors yellow, magenta, cyan, and black used in each developing unit being different, the image forming units 1a, 1b, 1c, and 1d have the same configuration. Hereinafter, the image forming unit 1a will be described, and the other image forming units 1b, 1c, and 1d are deemed to have been described by way of replacing the reference letter "a" with "b", "c", and "d". A photosensitive member a of the image forming unit 1a is an image carrier that is rotationally driven during image formation. Note that the photosensitive member a is charged to a uniform electric potential by a charging roller that is not shown. An exposure unit 6 scans and exposes the charged photosensitive member a with light and forms an electrostatic latent image on the photosensitive member a. A development unit, which is not shown, of the image forming unit 1a forms a toner image by applying toner to the electrostatic latent image on the photosensitive member a. A primary transfer roller 2a transfers the toner image on the photosensitive member a to the intermediate transfer belt 2. Note that a full-color toner image is formed by superimposing toner images of the respective colors formed by the image forming units 1a, 1b, 1c, and 1d, and transferring the superimposed toner images to the intermediate transfer belt 2.

The intermediate transfer belt 2 is an endless belt member that spans and is supported by a tension roller 27, a drive roller 26, a secondary transfer stretch roller 25, and primary transfer stretch rollers 28 and 29. Then, during image formation, the intermediate transfer belt 2 rotates in the direction indicated by an arrow R2 in accordance with the rotation of the drive roller 26. Accordingly, the toner image on the intermediate transfer belt 2 is conveyed toward a secondary transfer unit T2. Meanwhile, a separation roller 8 separates recording material P in a cassette 4 sheet-by-sheet and sends the sheets to registration rollers 9. The registration rollers 9 wait in a stopped state after receiving the recording material P, and send the recording material P to the secondary transfer region T2 to match the timing of the toner image on the intermediate transfer belt 2. The secondary transfer region T2 is a region where the intermediate transfer belt 2 contacts with a secondary transfer roller 22, and in the secondary transfer region T2, the secondary transfer roller 22 transfers the toner image on the intermediate transfer belt 2 to the recording material P. A fixing unit 5 forms a heating nip by pressing a pressure roller 5b against a fixing roller 5a provided with a heater. In the process of being sandwiched and conveyed by the heating nip, the recording material P is heated and pressed, and thus the toner image is fixed onto the recording material P. A discharge roller 11 discharges the recording material P with the fixed toner image to a paper discharge tray 7. Note that a sensor 80 for detecting the density of the toner image formed on the intermediate transfer belt 2 is provided facing the intermediate transfer belt 2.

Figure 2:
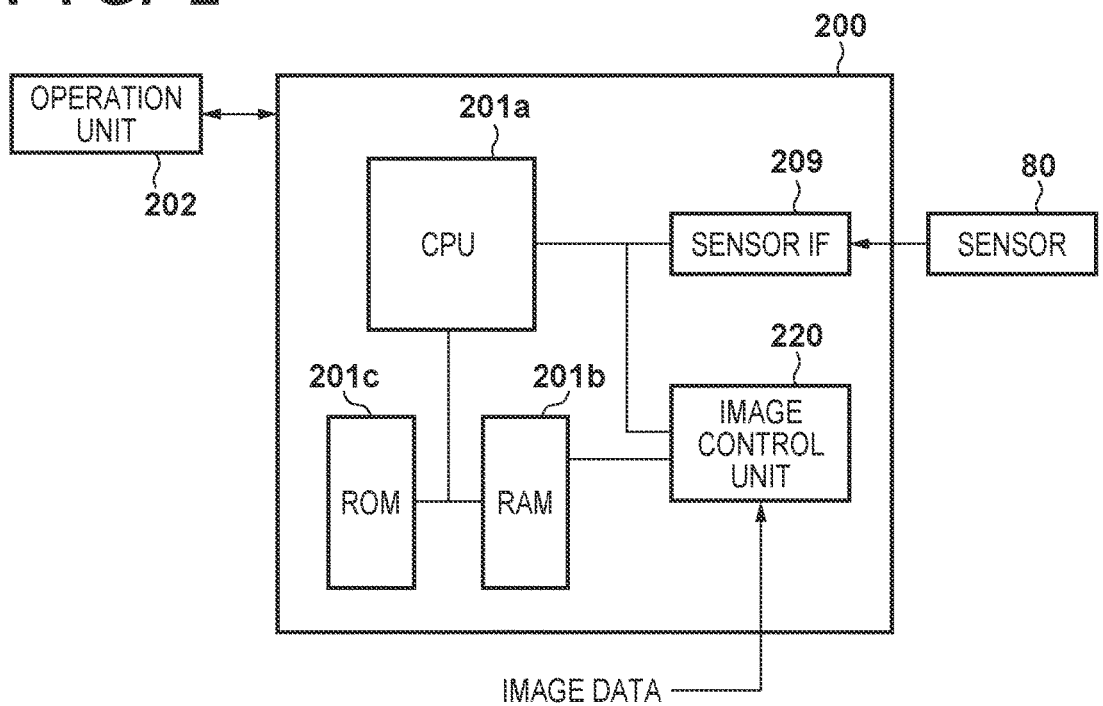
FIG. 2 is a control configuration diagram of the image forming apparatus according to an embodiment.

FIG. 2 shows a control configuration of the image forming apparatus according to the present embodiment. A controller 200 performs overall control of the image forming apparatus. An operation unit 202 is a user interface for a user to input instructions to operate the image forming apparatus, and for displaying various types of information to the user. A CPU 201a performs various types of processes by executing programs stored in a ROM 201c. A RAM 201b is a storage unit that stores various types of data and the like that the CPU 201a uses to control the image forming apparatus. An image control unit 220 controls the units shown in FIG. 1 to form an image based on image data. The CPU 201a executes density correction and management of a temperature characteristics table, described later, upon receiving a signal output by the sensor 80 via a sensor IF 209.

Figure 3:
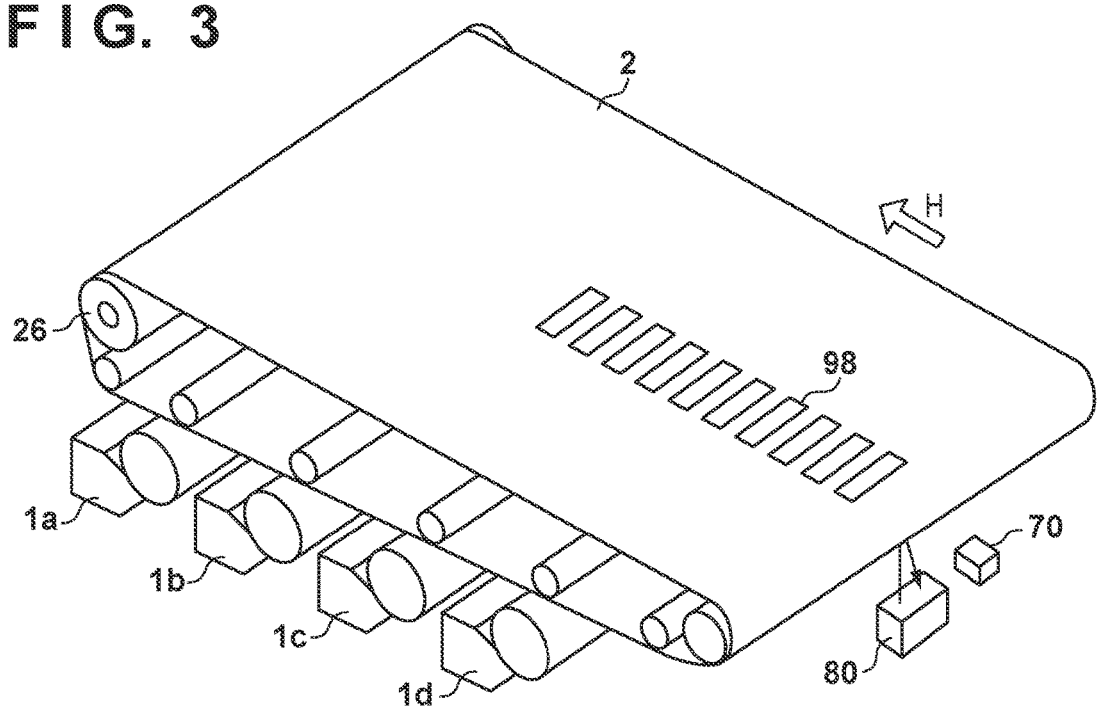
FIG. 3 is a perspective view showing a configuration of the periphery of an intermediate transfer belt according to an embodiment.

FIG. 3 is a diagram showing a configuration of the periphery of the intermediate transfer belt 2 of the image forming apparatus according to the present embodiment. The drive roller 26 is driven by a drive motor that is not shown, and the intermediate transfer belt 2 is rotationally driven by the rotation of the drive roller 26 in the direction indicated by an arrow H in the diagram. The sensor 80, which is an optical sensor, is arranged at a position facing the intermediate transfer belt 2, and furthermore, a temperature sensor 70 that operates as a temperature detection unit that detects the temperature of the sensor 80 is arranged facing the intermediate transfer belt 2. When density correction is to be performed, the image forming units 1a to 1d form, on the intermediate transfer belt 2, a density correction test pattern 98 that includes a plurality of patches, and the sensor 80 emits light toward the intermediate transfer belt 2 and then detects the light that has reflected off the surface of the intermediate transfer belt 2 and the test pattern 98 formed on the intermediate transfer belt 2.

FIG. 4 is a configuration diagram of the sensor 80. The sensor 80 includes a light emitting element 80a and a light receiving element 80b. The light emitting element 80a is, for example, an infrared LED, and the light receiving element 80b is, for example, a phototransistor that is sensitive to infrared light. In density correction control, the light emitting element 80a emits light toward the intermediate transfer belt 2, and the light receiving element 80b receives the light that has reflected off the intermediate transfer belt 2 and the test pattern 98 formed on the intermediate transfer belt 2. The reflected light received by the light receiving element 80b has an intensity that corresponds to the density of the patches on the test pattern, and thus, the controller 200 detects the density of the patches. Note that the light emitted by the sensor 80 is not limited to infrared light, and can be visible light.

FIG. 5 is a configuration diagram of a light receiving circuit 90 that is included in the sensor IF 209. When light is incident on the light receiving element 80b, a current is generated and this current is input to the light receiving circuit 90, and is converted into a voltage by resistors 62 and 63. An operation amplifier 64 performs impedance conversion, and the output from the operation amplifier 64 is converted by resistors 65 and 66 to be in the optimal voltage range for the CPU 201a, and input to the CPU 201a as a detection voltage of the sensor 80. As described above, a dark current flows through the light receiving element 80b, and thus, even when the light emitting element 80a is not emitting light, the light receiving circuit 90 outputs a voltage of a certain value. This voltage is the offset voltage. Note that the offset voltage is obtained by measuring the voltage output from the light receiving circuit 90 in a state where the light emitting element 80a of the sensor 80 has been turned OFF.

If the voltage of the output signal of the light receiving circuit 90 at the time a patch of the test pattern is detected, that is, a detection voltage of the CPU 201a is S1, and the offset voltage at this time is S0, a density Y1 of the corresponding patch is obtained using the following formula:

$$Y1 = k \times (S1 - S0)$$

Note that k is a predetermined constant that is greater than 0. In other words, the CPU 201a obtains the density of the patch using a value that is obtained by subtracting the offset voltage that indicates the offset value from the detection voltage. Note that dark current has temperature characteristics, and the value thereof changes according to the temperature of the sensor 80. Therefore, the offset voltage also changes according to the temperature.

FIG. 6 is a diagram showing an example of a relation between the temperature of the sensor 80 and the offset voltage. Regarding the relation in FIG. 6, when the sensor temperature is 15° C. and when it is 40° C., a difference of 59 mV will occur in the offset voltage. Accordingly, if the temperature of the sensor when the offset voltage is measured is different from the temperature of the sensor at the time of density correction, there is a need to consider the difference in temperature when obtaining the density of a patch.

Figure 7A:
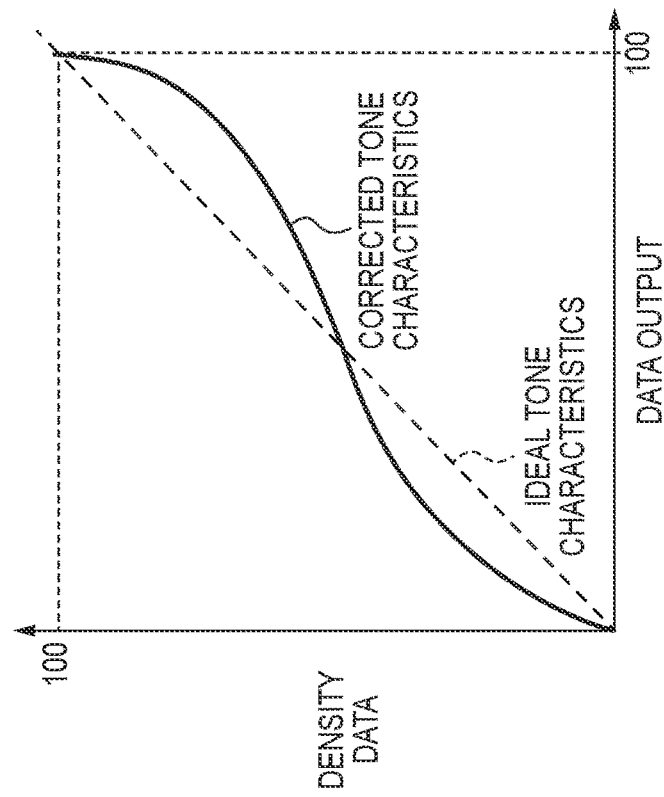
FIGS. 7A and 7B are diagrams illustrating generation processing of a tone correction table according to an embodiment.
Figure 7B:
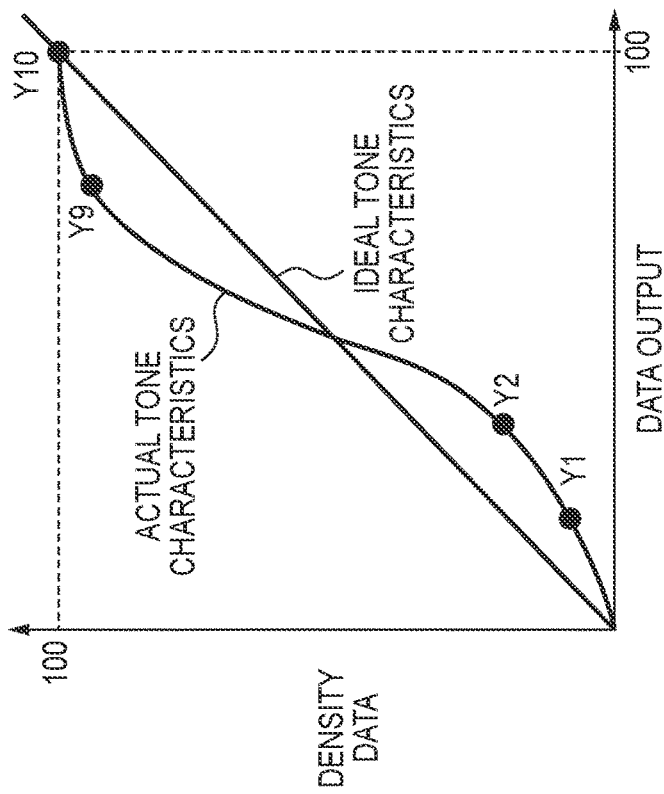

FIGS. 7A and 7B are diagrams illustrating a tone correction table generated in the density correction control. Based on data output values used to form a test pattern that is a test image, which includes a plurality of patches with differing densities, and density data detected for each patch, the CPU 201a creates an approximation curve on the tone characteristics graph shown in FIG. 7A. In FIG. 7A, Y1, Y2, Y9, and Y10 correspond to the formed patches. The CPU 201a calculates an incremental difference between the tone characteristics in the graph and the ideal tone characteristics shown by a straight line in FIG. 7A, and a tone correction table for correcting to the ideal tone characteristics, as shown in FIG. 7B, is created and stored in the RAM 201b. Note that the density correction is executed for each color.

Figure 8:
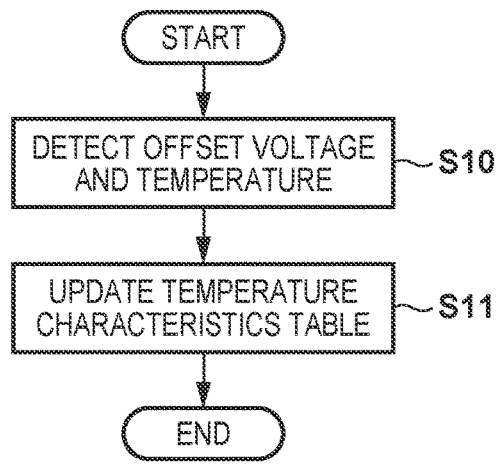
FIG. 8 is a flowchart of update processing for a temperature characteristics table according to an embodiment.

In the present embodiment, temperature characteristics are updated when initial operations are performed upon the image forming apparatus being powered on. Here, a temperature characteristics table is a table that shows a relation between the temperature of the sensor 80 and the offset voltage, that is, a table that shows temperature characteristics information regarding the sensor 80. Note that the initial data of the temperature characteristics table is representative data that matches with the characteristics of the sensor 80, and is stored in advance to the image forming apparatus. FIG. 8 is a flowchart of update processing for the temperature characteristics table performed during the initial operations. In step S10, at the same time that the offset voltage is being detected, the controller 200 detects the temperature of the sensor 80 using the temperature sensor 70. The controller 200 updates the temperature characteristics table stored in the RAM 201b based on the offset voltage and the detected temperature of the sensor 80.

Figure 9:
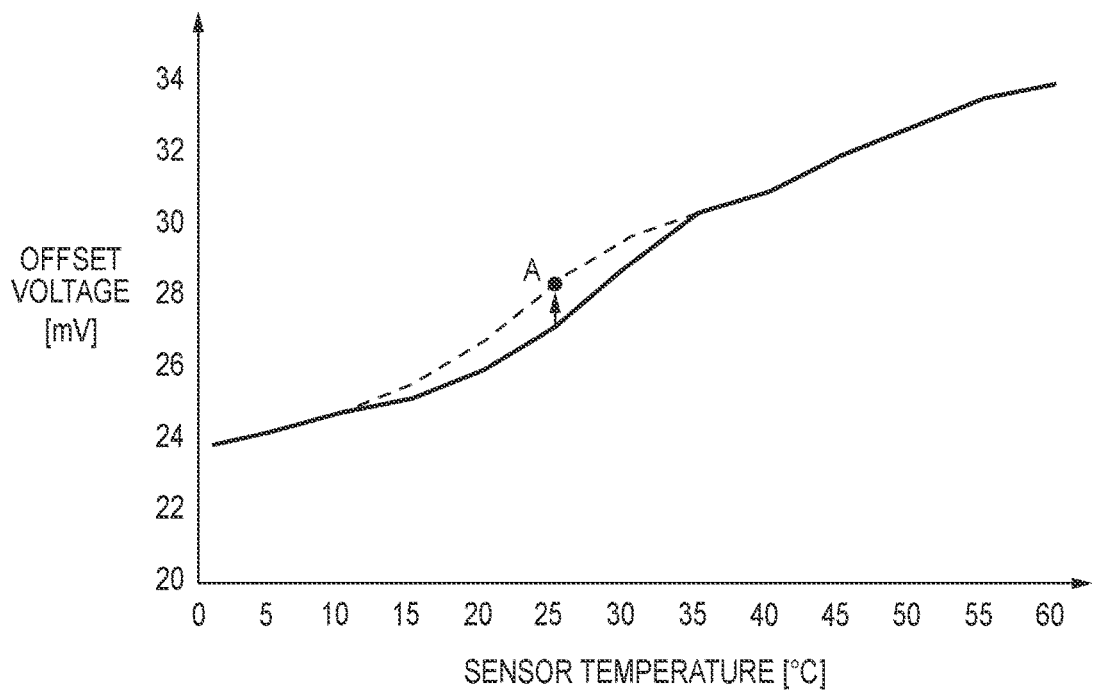
FIG. 9 is a diagram illustrating update processing for the temperature characteristics table according to an embodiment.

FIG. 9 is a diagram that illustrates the processing up until step S11 in FIG. 8. The solid line in FIG. 9 indicates a relation between the sensor temperature and the offset voltage prior to the temperature characteristics table being updated. Also, point A in FIG. 9 indicates the sensor temperature and the offset voltage detected in step S10. As an example, the controller 200 updates the temperature characteristics table by polynomially approximating the offset voltage at a plurality of predetermined temperatures in the pre-correction temperature characteristics table and the offset voltage at the sensor temperature measured in step S11.

As an example, the image forming apparatus according to the present embodiment includes a temperature control unit that is not shown. The temperature control unit includes a fan and a heater, for example, and is provided to maintain the temperature in the image forming apparatus in a predetermined temperature range. For example, in the present example, the controller 200 controls a fan and a heater so as to maintain the temperature of the image forming apparatus to be in a temperature range of 10° C. to 35° C. In this case, for example, the temperature characteristics table is updated, as shown by the dotted line in FIG. 9, by quadnomially approximating the offset voltages at 5° C., 10° C., 35° C., and 40° C. of the pre-correction temperature characteristics table and the offset voltage at the sensor temperature measured in step S11. In other words, for example, the offset value at a temperature selected from a temperature outside a predetermined temperature range at which the image forming apparatus operates or from the upper limit and lower limit of the predetermined temperature range, and the offset voltage at the measured temperature are used to update the temperature characteristics in an operating range.

Note that the method for updating the temperature characteristics table is not limited to the method described above. For example, the order of the polynomial used for approximation may be an ordinal other than four. Also, the temperatures in the pre-update temperature characteristics table that are used in the approximation may be temperatures other than those above, and the number of temperatures is not limited to four. Furthermore, the temperatures in the pre-update temperature characteristics table that are to be used in approximation may be temperatures other than those outside an operating range of the image forming apparatus or the temperatures at the upper limit and the lower limit of the operating range, as described above. Also, for example, a mode may be employed in which the difference between the pre-update offset voltage at the temperature detected in step S10 and the offset voltage detected in step S10 is obtained, and the pre-update offset voltage is shifted for an amount that corresponds to the difference. Furthermore, a configuration may be employed in which the temperature characteristics table is not updated only at the time of power on, but at an arbitrary predetermined timing such as when the image forming apparatus has returned from a power saving mode, for example. In either case, repeating the processing shown in FIG. 8 results in the temperature characteristics table in the sensor 80 more accurately indicating the actual temperature characteristics of the light receiving element 80b.

Figure 10:
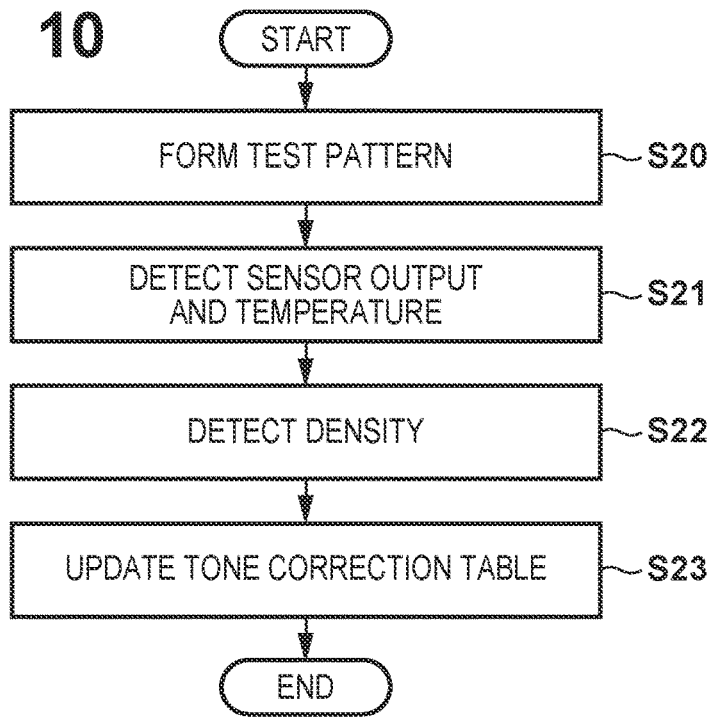
FIG. 10 is a flowchart of density correction control according to an embodiment.

FIG. 10 is a flowchart of density correction control according to the present embodiment. The density correction control is started when a predetermined condition is met. The predetermined condition can, for example, be set such that the density correction control is performed after print jobs for a predetermined number of sheets or more have ended. Also, a configuration may be employed in which density correction control is started upon the time elapsed from power on or the time elapsed from the previous density correction control reaching a predetermined period of time. Furthermore, the density correction control can be performed following correction of the temperature characteristics table in the initial operations or the like. As a result of starting the density correction control, the controller 200 forms a test pattern on the intermediate transfer belt 2 in step S20. In step S21, the controller 200 detects the output voltage of the sensor 80 and the temperature of the sensor 80. In step S22, the controller 200 obtains the offset voltage at the current temperature based on the temperature of the sensor 80 and the temperature characteristics table, and obtains the density of the patches in the test pattern using a value obtained by subtracting the offset voltage from the output voltage of the sensor 80. Thereafter, in step S23, the controller 200 updates the tone correction table based on the detected density of the patches.

Thus, when the predetermined condition is met, the temperature of the sensor 80 and offset voltage are measured, and the temperature characteristics table is updated and stored. Then, during density correction control, the offset voltage is determined based on the stored temperature characteristics table, and the density of each of the patches is detected. Note that respective starting conditions are set so that the frequency at which the temperature characteristics table is updated is less than that of the frequency of density correction control. According to this configuration, accurate density correction can be performed while reducing the time taken for density correction control.

Second Embodiment

In the first embodiment, the predetermined condition is power on, and the temperature characteristics table is updated at the time of power on. Regarding the present embodiment, at the time of power on, the temperature characteristics table compares the temperature of the sensor 80 of the previous update and the current temperature of the sensor 80, and if the difference is in a predetermined range, the temperature characteristics table is not updated. On the other hand, if the difference is outside the predetermined range, the temperature characteristics table is updated in the same manner as in the first embodiment.

Figure 11:
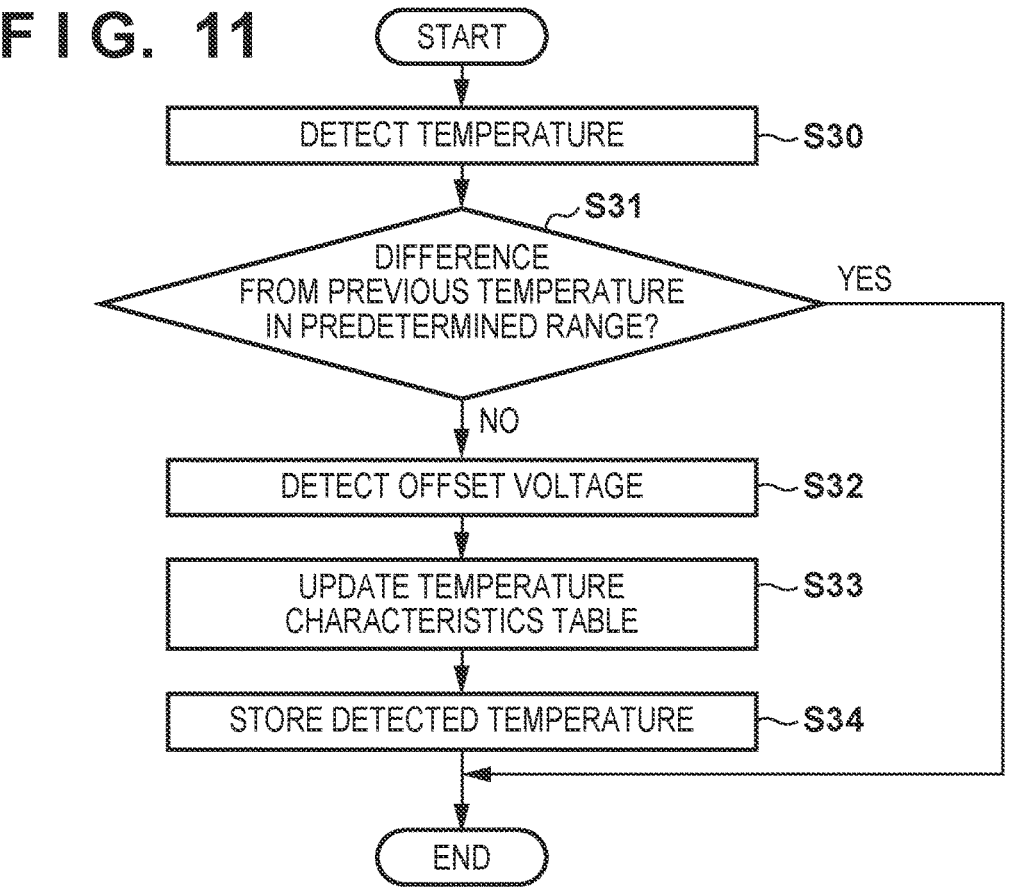
FIG. 11 is a flowchart of update processing for the temperature characteristics table according to an embodiment.

FIG. 11 is a flowchart of the update processing for the temperature characteristics table according to the present embodiment. In the initial operations at the time of power on, the controller 200, in step S30, first detects the temperature of the sensor 80 using the temperature sensor 70. The controller 200 determines whether the difference between the temperature at the previous update of the temperature characteristics table stored in the RAM 201b and the temperature detected in step S30 is in a predetermined range. If the difference in temperature is in the predetermined range, the controller 200 ends the processing without updating the temperature characteristics table. On the other hand, if the difference in temperature is outside the predetermined range, the controller 200 detects the offset voltage in step S32, and performs processing to update the temperature characteristics table in step S33. Note that the processing in step S33 is the same as the processing in step S11 in FIG. 8 and redundant description thereof is omitted. The controller 200, in step S34, stores the temperature detected in step S30 to the RAM 201b, after the temperature characteristics table has been updated.

Thus, in the present embodiment, the temperature characteristics table is updated when the change in temperature from the previous update of the temperature characteristics table is outside a predetermined range. Accordingly, the processing time for maintaining the temperature characteristics table can be further reduced.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)m), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-175888, filed on Sep. 7, 2015, which is hereby incorporated by reference herein in its entirety.

What is claimed is:

1. An image forming apparatus comprising:
an image carrier;
an image forming unit configured to form an image on the image carrier;
a light emitting unit configured to emit light;
an output unit configured to receive light reflected from a measurement image on the image carrier and output a signal corresponding to a light receiving result;
a detection unit configured to detect a temperature of the output unit;
a conversion unit configured to convert an output value output from the output unit, based on a conversion condition;
a controller configured to control an image forming condition for adjusting a density of an image to be formed by the image forming unit, based on a converted output value by the conversion unit; and
a generation unit configured to, at a predetermined timing, acquire an output value output from the output unit without the light emitting unit emitting light, control the detection unit to detect the temperature of the output unit, and generate the conversion condition based on the acquired output value and the detected temperature.

2. The image forming apparatus according to claim 1, wherein
the conversion condition is a condition that is based on a relation between the output value from the output unit when the light emitting unit is not emitting light and the temperature of the output unit, and
the generation unit generates the conversion condition by polynomially approximating the detected temperature and the acquired output value at the predetermined timing, at a plurality of predetermined temperatures in the relation and a plurality of output values that correspond to the plurality of predetermined temperatures, and updating the relation with the polynomial used in the approximation.

3. The image forming apparatus according to claim 2, further comprising:
a temperature control unit configured to control a temperature of the image forming apparatus to be in a predetermined temperature range,
wherein the plurality of predetermined temperatures are temperatures selected from temperatures outside the predetermined temperature range and temperatures that are an upper limit and a lower limit of the predetermined temperature range.

4. The image forming apparatus according to claim 1, wherein a frequency of the predetermined timing is less than a frequency at which the controller controls the image forming condition.

5. The image forming apparatus according to claim 1, wherein the generation unit does not generate the conversion condition at the predetermined timing if a difference between the temperature detected by the detection unit at the predetermined timing and the temperature detected by the detection unit when the conversion condition was generated is in a predetermined range.

6. The image forming apparatus according to claim 1, wherein the predetermined timing is a timing at which the image forming apparatus is powered on.

7. The image forming apparatus according to claim 1, wherein the predetermined timing is a timing at which the image forming apparatus returns from a power saving mode.

8. The image forming apparatus according to claim 1, wherein the conversion unit converts the output value output by the output unit when the light that is reflected from the measurement image is received based on a value obtained from the temperature of the output unit detected by the detection unit when the light reflected from the measurement image is received by the output unit and the conversion condition.

* * * * *